US008408764B2

(12) United States Patent
Chung et al.

(10) Patent No.: US 8,408,764 B2
(45) Date of Patent: Apr. 2, 2013

(54) VEHICULAR LAMP

(75) Inventors: Yao-Te Chung, Tainan (TW); Kun Yeh Lin, Tainan (TW)

(73) Assignee: Min Hsiang Corporation, Tainan (TW)

( * ) Notice: Subject to any disclaimer, the term of this patent is extended or adjusted under 35 U.S.C. 154(b) by 205 days.

(21) Appl. No.: 13/006,425

(22) Filed: Jan. 14, 2011

(65) Prior Publication Data

US 2012/0182750 A1 Jul. 19, 2012

(51) Int. Cl.
*B60Q 1/00* (2006.01)

(52) U.S. Cl. ......................... 362/487; 362/516; 362/545

(58) Field of Classification Search ........... 362/459–549
See application file for complete search history.

(56) References Cited

U.S. PATENT DOCUMENTS

| | | | | |
|---|---|---|---|---|
| 7,762,700 | B2 * | 7/2010 | Luo et al. | 362/545 |
| 2009/0097247 | A1 * | 4/2009 | Tseng et al. | 362/241 |

* cited by examiner

*Primary Examiner* — William Carter

(57) ABSTRACT

A vehicular lamp includes a reflective housing having a first recessed portion with a reflective surface. An outer housing made of heat dissipating material is fixed to the reflective housing and includes a plurality of fins on an outer surface thereof. The outer housing further includes a second recessed portion receiving the reflective housing. A receiving portion is provided behind the second recessed portion and receives a circuit board. A heat conductive seat made of heat dissipating material includes a connecting plate fixed to the outer housing. An extension extends from the connecting plate to a central, front portion of the reflective housing. The LED light module is mounted to the extension and electrically connected to the circuit board. A light-transmitting cover is mounted to and covers openings of the reflective housing and the outer housing.

2 Claims, 7 Drawing Sheets

VEHICULAR LAMP

BACKGROUND OF THE INVENTION

The present invention relates to a vehicular lamp and, more particularly, to a vehicular lamp providing enhanced heat dissipating efficiency and enhanced assembling stability.

Vehicular lamps have been developed from conventional halogen lamps to high-intensity discharge (HID) lamps and then to LED lamps. LED lamps for vehicles do not include stabilizers required in HID lamps and consume less energy while having the advantages of small volume, light weight, high on/off speed, excellent resistance to vibration, and long service life.

However, the LED lamps for vehicles can only reliably work in a suitable working environment generally below 80° C. The crystalline grains of the LEDs have low lighting efficiency or could be damaged at high temperature. Thus, it is important to provide heat dissipation for the LED lamps for vehicles, so that the LED lamps can work smoothly.

FIG. 7 shows a conventional LED lamp for vehicles. The LED lamp includes an LED light module 1', a reflective housing 2', and a light-transmitting cover 3'. The reflective housing 2' includes a front opening and a central recessed portion 21' with a reflective surface 22'. The LED light module 1' is mounted in the recessed portion 21' and emits light beams towards the front opening and the reflective surface 22' of the reflective housing 2'. Most part of the light beams from the LED light module 1' transmits the light-transmitting cover 3' directly, and a portion of the light beams transmits the light-transmitting cover 3' after reflection by the reflective surface 22'.

However, it is difficult to control the lighting patterns, because most part of the light beams directly transmits the light-transmitting cover 3'. Furthermore, the reflective housing 2' provides poor heat dissipation, leading to poor heat dissipating effect while the LED light module 1' emits light beams.

BRIEF SUMMARY OF THE INVENTION

An objective of the present invention is to provide a vehicular lamp capable of controlling the lighting patterns, providing enhanced heat dissipating efficiency, and providing enhanced assembling stability.

A vehicular lamp according to the present invention includes an LED light module. A reflective housing includes a first recessed portion having a reflective surface. The reflective housing further includes an opening in a front end thereof and in communication with the first recessed portion. An outer housing made of heat dissipating material is fixed to the reflective housing. The outer housing includes a plurality of fins on an outer surface thereof. The outer housing further includes a second recessed portion receiving the reflective housing. The outer housing further includes an opening in a front end thereof and in communication with the second recessed portion. A receiving portion is provided behind the second recessed portion. A circuit board received in the receiving portion. A heat conductive seat made of heat dissipating material includes a connecting plate fixed to the outer housing. An extension extends from the connecting plate to a central, front portion of the reflective housing. The extension includes a coupling seat. The LED light module is mounted to the coupling seat and electrically connected to the circuit board. A light-transmitting cover is mounted to and covers the openings of the reflective housing and the outer housing.

The LED light module emits light beams to the reflective surface of the reflective housing. The reflective surface reflects the light beams to a predetermined position. Heat generated by the LED module is conducted by the heat conductive seat to the outer housing. The heat dissipating efficiency and the assembling reliability are enhanced.

Other objectives, advantages, and novel features of the invention will become more apparent from the following detailed description when taken in conjunction with the accompanying drawings.

DETAILED DESCRIPTION OF THE INVENTION

Figure 1:
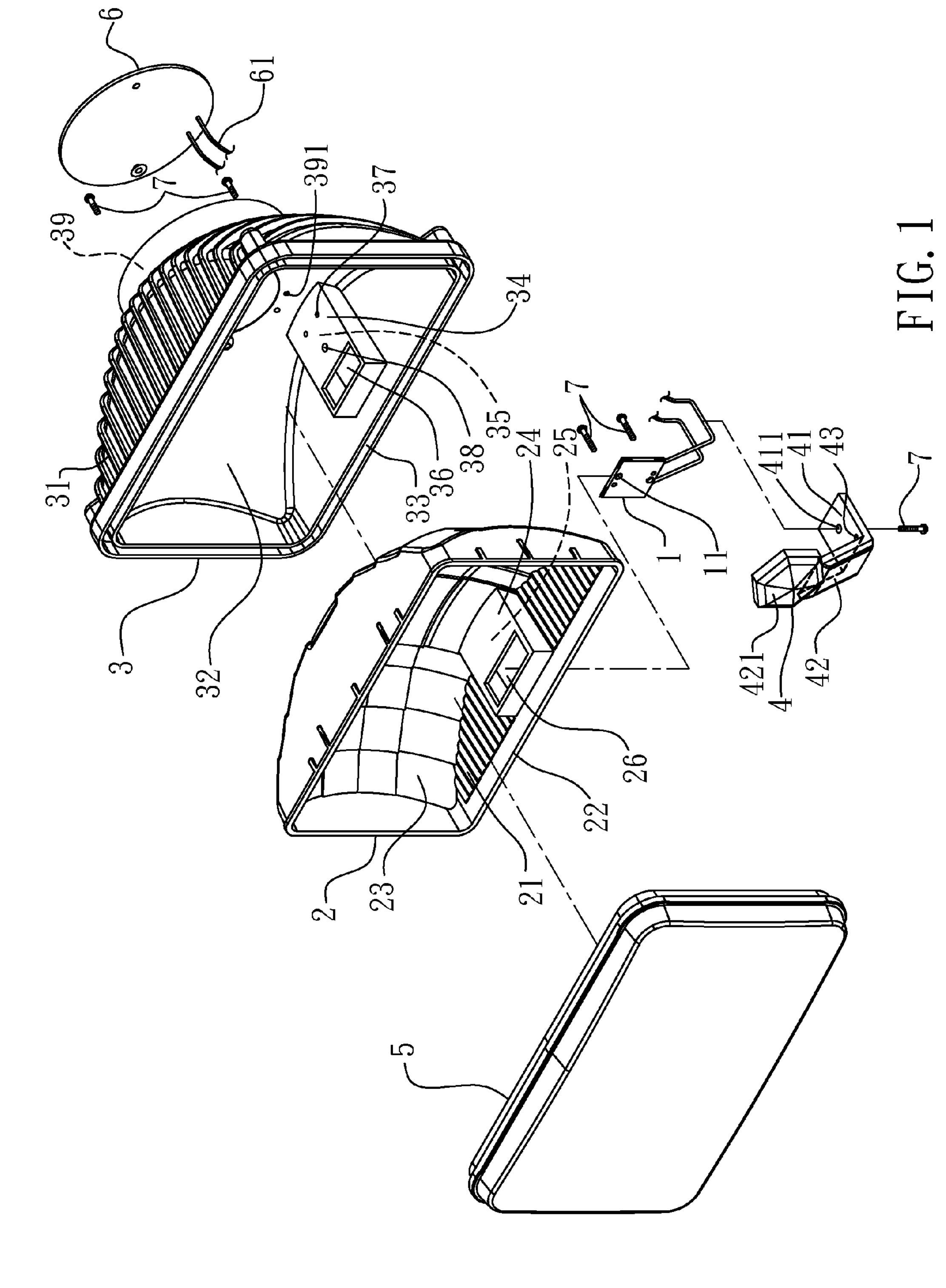
FIG. 1 shows an exploded, perspective view of a vehicular lamp according to the preferred teachings of the present invention.
Figure 2:
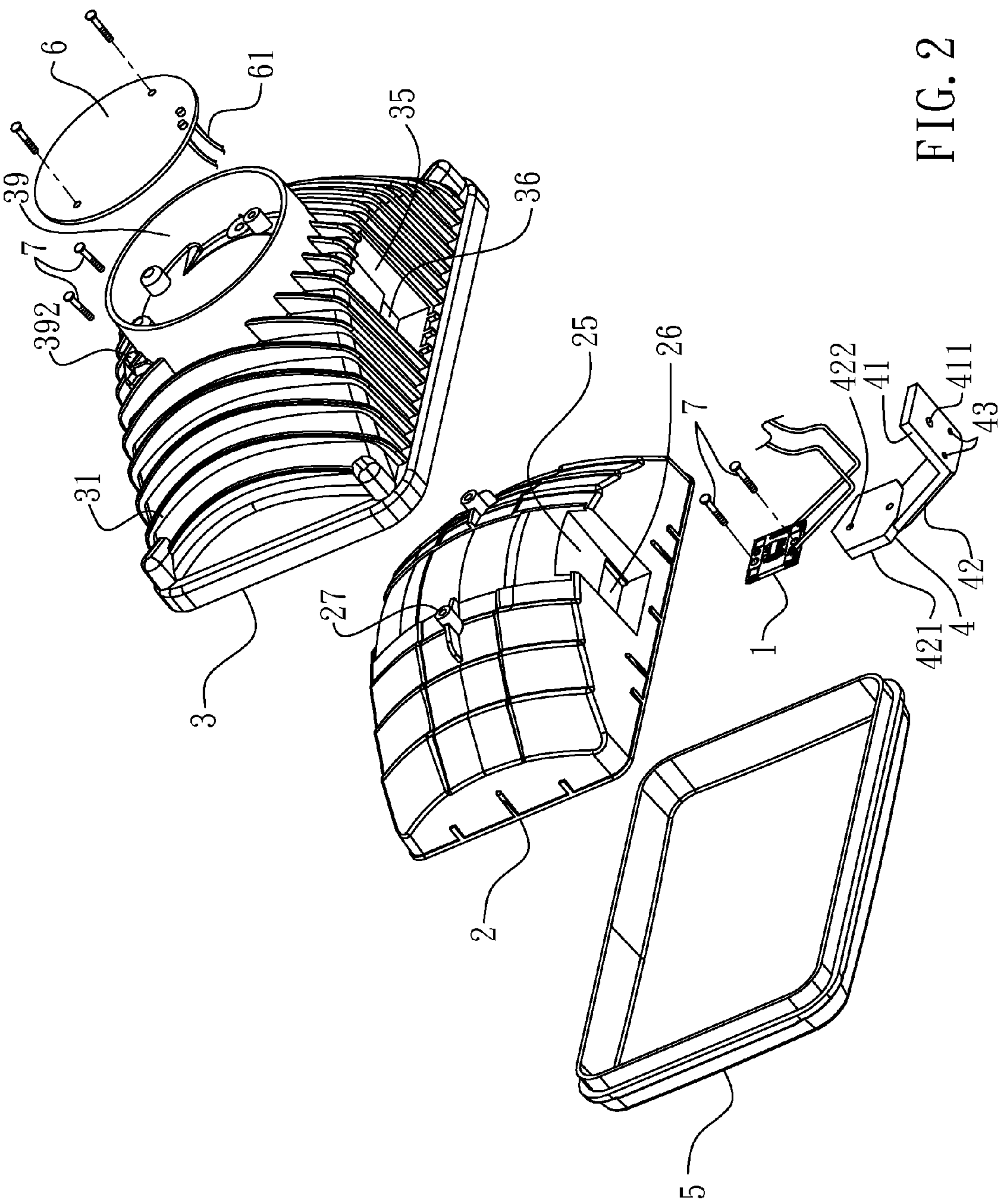
FIG. 2 shows another exploded, perspective view of the vehicular lamp of FIG. 1.
Figure 3:
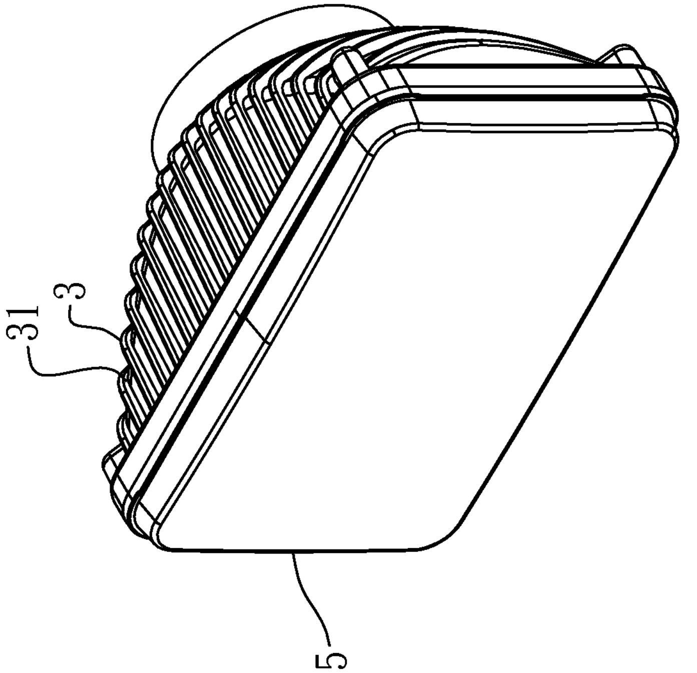
FIG. 3 shows a perspective view of the vehicular lamp of FIG. 1.
Figure 4:
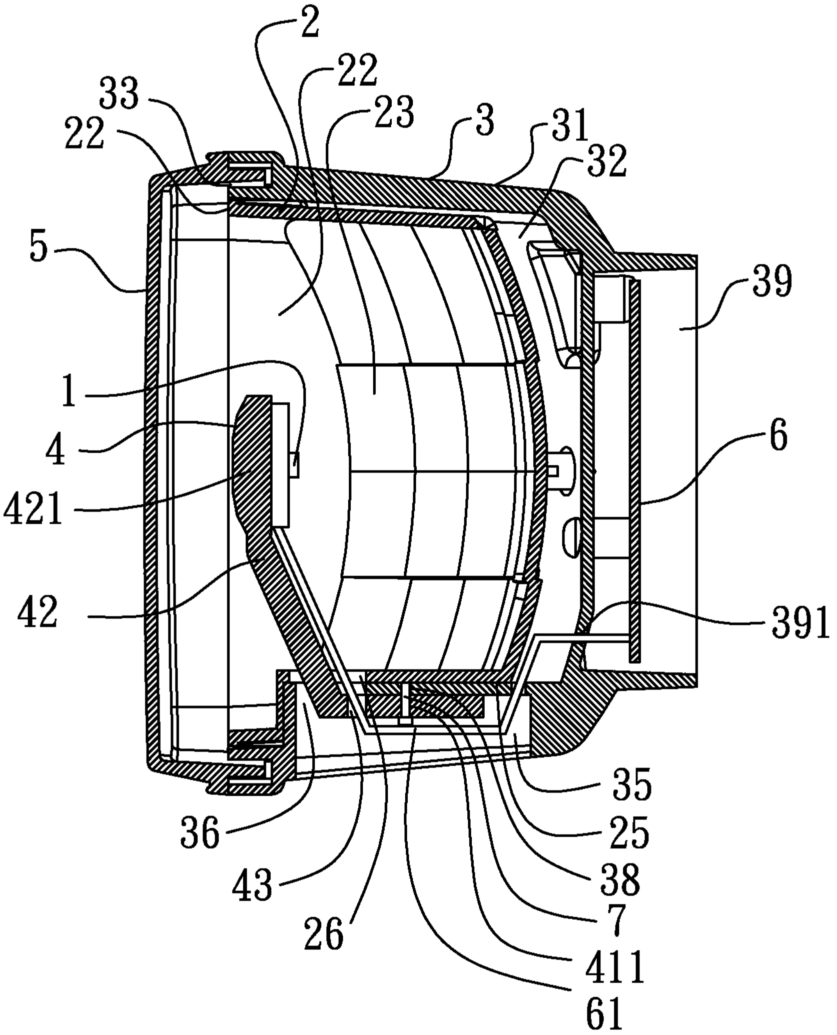
FIG. 4 shows a cross sectional view of the vehicular lamp of FIG. 3.

With reference to FIGS. 1-4, a vehicular light according to the present invention generally includes an LED light module 1, a reflective housing 2, an outer housing 3, a heat conductive seat 4, a light-transmitting cover 5, and a circuit board 6. The reflective housing 2 includes a first recessed portion 21 having a reflective surface 23. The reflective housing 2 further includes an opening 22 in a front end thereof and in communication with the first recessed portion 21. A protrusion 24 is formed on a lower section of an inner periphery of the first recessed portion 21 and includes an engaging groove 25 in an outer side thereof. The protrusion 24 further includes an insertion hole 26. Fixing holes 27 are formed in a rear end of the reflective housing 2.

The outer housing 3 is made of material with good heat dissipating characteristics. The outer housing 3 includes a plurality of fins 31 on an outer surface thereof for increasing the heat dissipating area. The outer housing 3 further includes a second recessed portion 32 for receiving the reflective housing 2. The outer housing 3 further includes an opening 33 in a front end thereof and in communication with the second recessed portion 32. A protruded portion 34 is formed on a lower section of an inner periphery of the second recessed portion 32 and includes an outer face having a groove 35. The protruded portion 34 further includes an insertion hole 36, two through-holes 37, and a fixing hole 38. A receiving portion 39 is provided behind a rear wall of the second recessed portion 32 for receiving a circuit board 6. The receiving portion 39 includes through-holes 391 through which wires 61 of the circuit board 6 extend. The outer housing 3 further includes fixing holes 392 in a rear end thereof. The reflective housing 2 is received in the second recessed portion 32 of the outer housing 3. The protruded portion 34 of the outer housing 3 is received in the engaging groove 25 of the reflective housing 2. Fasteners 7 are extended through fixing holes 392 and 27 to fix the outer housing 3 and the reflective housing 2 together. The insertion holes 26 and 36 are aligned with each other.

The heat conductive seat 4 is made of material with good heat dissipating characteristics, such as aluminum. The heat conductive seat 4 includes a connecting plate 41 extending through insertion holes 26 and 36 of the reflective housing 2 and the outer housing 3. The connecting plate 41 includes a connecting hole 411 aligned with the fixing hole 38 of the outer housing 3. The connecting plate 411 of the heat conductive seat 4 is received in the groove 35 of the outer housing 3. A fastener 7 is extended through the fixing holes 38 and 411 to fix the connecting plate 41 to the protruded portion 34 of the outer housing 3. The fastener 7 can not be seen from the front, providing an aesthetic appearance. An extension 42 extends from the connecting plate 41 and extends to a central, front portion of the reflective housing 2. The extension 42 has a coupling seat 421 having coupling holes 422. The LED light module 1 is fixed to the coupling seat 421 by extending fasteners 7 through coupling holes 422 and holes 11 of the LED light module 1. The heat conductive seat 4 further includes through-holes 43. The wires 61 of the circuit board 6 are extended through the through-holes 37 of the outer housing 3 and the through-holes 43 of the heat conductive seat 4 and are electrically connected to the LED light module 1. The LED light module 1 can emit light beams rearward and sideward toward the reflective cover 2.

The light-transmitting cover 5 covers the openings 22 and 33 of the reflective housing 2 and the outer housing 3. Waterproof glue can be applied to engagement sections between the light-transmitting cover 5 and the openings 22 and 33 and to the groove 35 of the outer housing 3.

Figure 5:
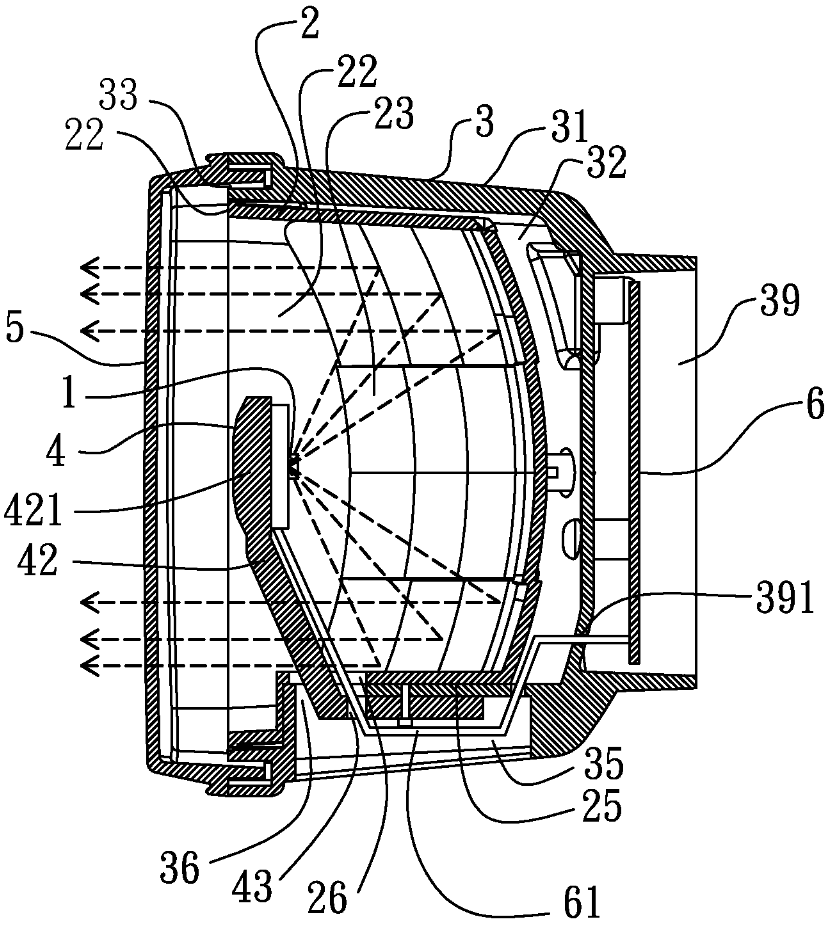
FIG. 5 shows a cross sectional view similar to FIG. 4, illustrating operation of the vehicular lamp.

With reference to FIG. 5, the LED light module 1 emits light beams to the reflective surface 23 of the reflective housing 2 from which the light beams are reflected. Through the reflecting angle of the reflective surface 23, the light beams can be reflected to a predetermined position to present preset lighting patterns. Furthermore, the heat generated by the LED light module 1 can be rapidly conducted by the heat conductive seat 4 to the outer housing 3 that has fins 31 for rapid heat dissipation, increasing the heat dissipating efficiency, enhancing the efficacy of the vehicular lamp, prolong the service life, and enhancing the reliability. Further, the vehicular lamp according to the present invention provides enhanced assembling reliability by engagement between the protruded portion 34 of the outer housing 3 and the engaging groove 25 of the reflective housing 2 in addition to engagement between the outer housing 3 and the reflective housing 2 by fasteners 7.

Figure 6:
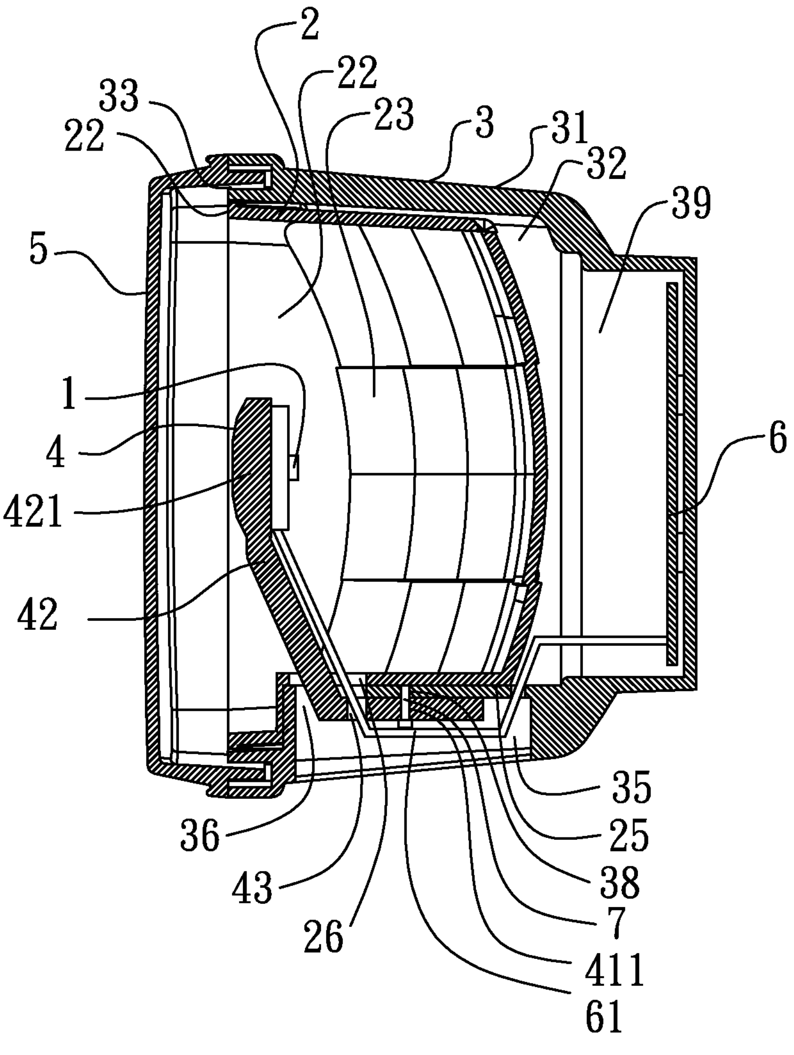
FIG. 6 shows a cross sectional view of a modified embodiment of the vehicular lamp according to the present invention.
Figure 7:
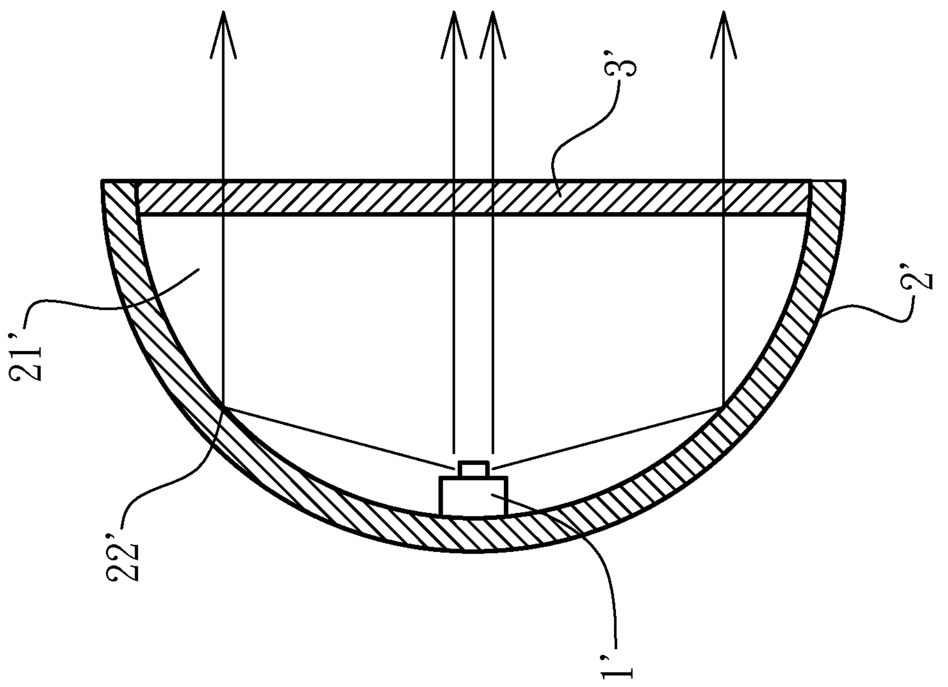
FIG. 7 (PRIOR ART)
FIG. 7 shows a cross sectional view of a conventional LED lamp for vehicles.

FIG. 6 shows a modified embodiment of the present invention, wherein the second recessed portion 32 of the outer housing 3 has a closed rear end forming the compartment 39 for receiving the circuit board 6, allowing easy installation of the wires 61.

It can be appreciated that the vehicular lamp according to the present invention can be mounted in different orientations. The protrusion 24 of the reflective housing 2 the protruded portion 34 of the outer housing 3 can be provided in other locations of the inner peripheries of the first and second recessed portions 22 and 32 instead of the lower sections.

The vehicular lamp according to the present invention can be used in any lighting portion in any vehicle such as a truck, an automobile, a motorcycle, or the like and provide enhanced heat dissipating effect and save energy.

Although specific embodiments have been illustrated and described, numerous modifications and variations are still possible without departing from the essence of the invention. The scope of the invention is limited by the accompanying claims.

The invention claimed is:

1. A vehicular lamp comprising:

an LED light module;

a reflective housing including a first recessed portion having a reflective surface, with the reflective housing further including an opening in a front end thereof and in communication with the first recessed portion;

an outer housing made of heat dissipating material, with the outer housing including a plurality of fins on an outer surface thereof, with the outer housing further including a second recessed portion receiving the reflective housing, with the outer housing further including an opening in a front end thereof and in communication with the second recessed portion, with a receiving portion provided behind the second recessed portion, with a circuit board received in the receiving portion, with the outer housing fixed to the reflective housing;

a heat conductive seat made of heat dissipating material, with the heat conductive seat including a connecting plate fixed to the outer housing, with an extension extending from the connecting plate to a central, front portion of the reflective housing, with the extension including a coupling seat, with the LED light module mounted to the coupling seat and electrically connected to the circuit board; and a light-transmitting cover mounted to and covering the openings of the reflective housing and the outer housing, wherein the LED light module emit light beams to the reflective surface of the reflective housing, the reflective surface reflects the light beams to a predetermined position, heat generated by the LED module is conducted by the heat conductive seat to the outer housing, with the reflective housing including a protrusion formed on an inner periphery of the first recessed portion with the first recessed portion including an engaging groove and a first insertion hole, with the second recessed portion of the outer housing including a protruded portion having a groove, a second insertion hole, and an fixing hole, with the reflective housing received in the second recessed portion of the outer housing, with the protruded portion of the outer housing received in the groove of the reflective housing, with the first insertion hole aligned with the second insertion hole, with the connecting plate including a connecting hole aligned with the fixing hole of the outer housing, with the connecting plate received in the groove of the outer housing, with a fastener extending through the connecting hole of the conductive seat and the fixing hole of the outer housing.

2. The vehicular lamp as claimed in claim 1, with each of the protruded portion of the outer housing and the connecting plate of the heat conductive seat including at least one through-hole, with the circuit board including at least one wire extending through said at least one through-hole of each of the outer housing and the heat conductive seat and electrically connected to the LED light module.

* * * * *